(12) United States Patent
Goetz et al.

(10) Patent No.: US 11,823,164 B1
(45) Date of Patent: Nov. 21, 2023

(54) USING A THIRD PARTY AS A SOURCE OF CASH

(71) Applicant: Wells Fargo Bank, N.A., San Francisco, CA (US)

(72) Inventors: Darren M. Goetz, Salinas, CA (US); Ashish B. Kurani, Hillsborough, CA (US); Joann Mar, San Francisco, CA (US); Dennis E. Montenegro, Concord, CA (US); Joseph Ng, San Mateo, CA (US); Damodar Raval, San Francisco, CA (US); Lisa Schur, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 908 days.

(21) Appl. No.: 16/660,625

(22) Filed: Oct. 22, 2019

(51) Int. Cl.
  *G06Q 20/32* (2012.01)
  *G06Q 40/02* (2023.01)
  *G06Q 20/40* (2012.01)
  *G06Q 50/30* (2012.01)

(52) U.S. Cl.
  CPC ... *G06Q 20/3221* (2013.01); *G06Q 20/40145* (2013.01); *G06Q 40/02* (2013.01); *G06Q 50/30* (2013.01)

(58) Field of Classification Search
  None
  See application file for complete search history.

(56) References Cited

U.S. PATENT DOCUMENTS

| | | | |
|---|---|---|---|
| 6,386,323 B1 | 5/2002 | Ramachandran et al. | |
| 7,676,415 B2 | 3/2010 | Foss et al. | |
| 7,922,581 B2 | 4/2011 | Potts | |
| 8,955,741 B2 | 2/2015 | Hansen et al. | |
| 9,892,386 B2 | 2/2018 | Liberty | |
| 10,255,578 B1 * | 4/2019 | Comeau | G07F 17/0092 |
| 10,453,041 B1 * | 10/2019 | Walker | G07F 19/206 |
| 11,526,861 B1 * | 12/2022 | Goetz | G05D 1/0011 |

(Continued)

OTHER PUBLICATIONS

"SoCash | Withdraw cash from shops", https://www.socash.io/, downloaded Jun. 13, 2019. 6 pages.

(Continued)

*Primary Examiner* — Kito R Robinson
*Assistant Examiner* — Shacole C Tibljas
(74) *Attorney, Agent, or Firm* — Foley & Lardner LLP

(57) ABSTRACT

A method comprises receiving, by a provider institution computing system via a network, a cash level indicator from each of a plurality of customer payment systems, the customer payment systems receiving cash from customers of a plurality of stores. The method further comprises receiving, by the provider institution computing system via the network, a cash request from a user device of a user. The provider institution computing system selects one of the plurality of customer payment systems based on the cash level indicator and location data of a plurality of delivery agent devices of delivery agents. The method further comprises sending, by the provider institution computing system to a selected delivery agent device, a message comprising location data of the selected customer payment system, the selected delivery agent device being one of the plurality of delivery agent devices.

24 Claims, 10 Drawing Sheets

(56) References Cited

U.S. PATENT DOCUMENTS

| | | | |
|---|---|---|---|
| 2003/0069843 A1 | 4/2003 | Kidd | |
| 2003/0229548 A1* | 12/2003 | Kakuta | G07F 7/0886 |
| | | | 705/26.1 |
| 2004/0215566 A1* | 10/2004 | Meurer | G06Q 10/10 |
| | | | 705/43 |
| 2007/0033138 A1 | 2/2007 | Obadan | |
| 2007/0244778 A1 | 10/2007 | Bailard | |
| 2019/0172050 A1* | 6/2019 | Winters | G06Q 20/3255 |

OTHER PUBLICATIONS

Gopal Sathe, "Snapdeal Cash@Home: Follow These Steps to Get Cash Delivered to Your Home", https://gadgets.ndtv.com/apps/news/snapdeal-offers-to-deliver-cash-to-your-home-1640622 Dec. 23, 2016. 4 pages. Dec. 23, 2016.

Raposo, Kevin, "Too lazy to hit up the ATM? This app will deliver you case", https://knowtechie.com/lazy-hit-atm-app-will-deliver-cash-104/ Oct. 4, 2014. 7 pages.

* cited by examiner

USING A THIRD PARTY AS A SOURCE OF CASH

BACKGROUND

Typically, to withdraw cash associated with a user's account, the user must be present at the site of the cash withdrawal. The user provides authenticating information (e.g., a passcode, etc.) to verify the user with the cash withdrawal system, and the cash withdrawal system provides cash to the user.

SUMMARY

In one arrangement, a method comprises receiving, by a provider institution computing system via a network, a cash level indicator from each of a plurality of customer payment systems, the customer payment systems receiving cash from customers of a plurality of stores. The method further comprises receiving, by the provider institution computing system via the network, a cash request from a user device of a user. The provider institution computing system selects one of the plurality of customer payment systems based on the cash level indicator and location data of a plurality of delivery agent devices of delivery agents. The method further comprises sending, by the provider institution computing system to a selected delivery agent device, a message comprising location data of the selected customer payment system, the selected delivery agent device being one of the plurality of delivery agent devices.

In another arrangement, a provider institution computing system comprises a network interface, and a processing circuit. The processing circuit is configured to receive a cash level indicator from each of a plurality of customer payment systems, the customer payment systems receiving cash from customers of a plurality of stores. The processing circuit is further configured to receive a cash request from a user device of a user and to select one of the plurality of customer payment systems based on the cash level indicator and location data of a plurality of delivery agent devices of delivery agents. The processing circuit is configured to send a message comprising location data of the selected customer payment system to a selected delivery agent device, the selected delivery agent device being one of the plurality of delivery agent devices.

In a further arrangement, a system for processing cash withdrawal and delivery requests, comprises a non-transitory computer-readable medium of a provider institution financial system storing computer-readable instructions such that, when executed, causes a processor to receive a cash level indicator from each of a plurality of customer payment systems, the customer payment systems receiving cash from customers of a plurality of stores. The system also causes the processor to receive a cash request from a user device of a user and select one of the plurality of customer payment systems based on the cash level indicator and location data of a plurality of delivery agent devices of delivery agents. The system also causes the processor to send a message comprising location data of the selected customer payment system to a selected delivery agent device, the selected delivery agent device being one of the plurality of delivery agent devices.

These and other features, together with the organization and manner of operation thereof, will become apparent from the following detailed description when taken in conjunction with the accompanying drawings.

DETAILED DESCRIPTION

Figure 1:
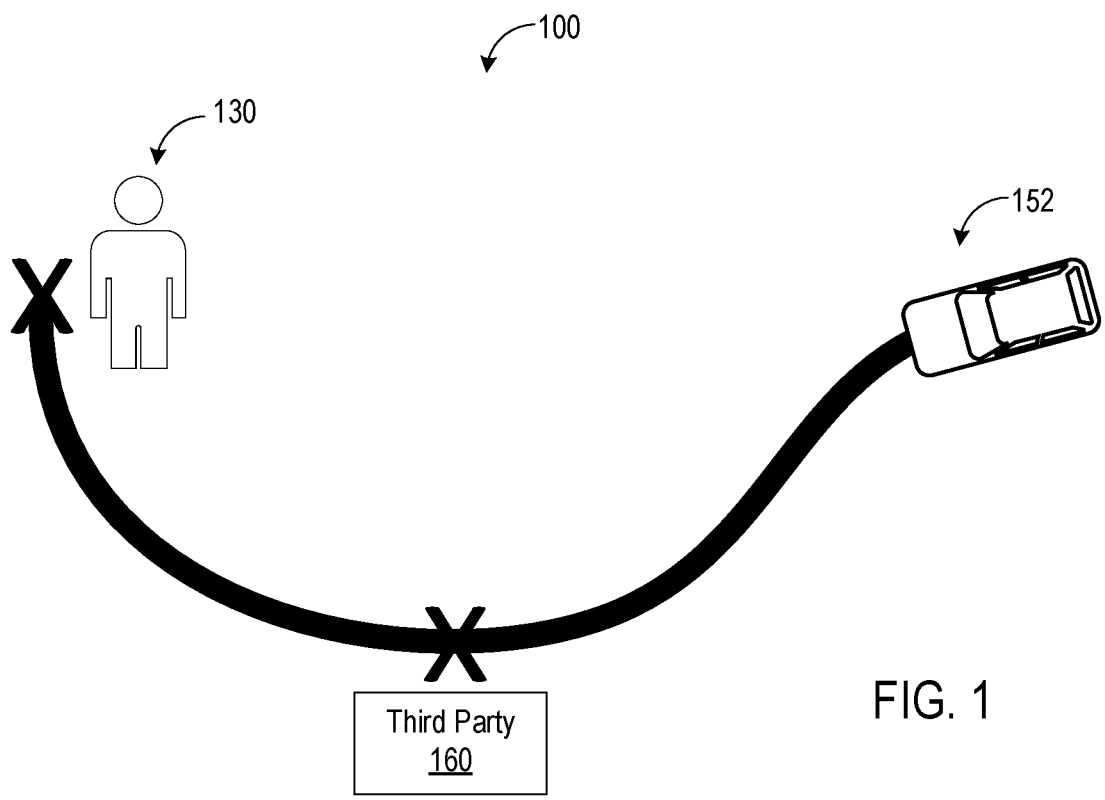
FIG. 1 is an illustration of a cash delivery method, according to some arrangements.

Referring generally to the FIGS., arrangements described herein relate to systems, methods, and non-transitory computer-readable media for providing cash to a user from a third party. In some arrangements, a provider financial institution computing system communicates with a user, a delivery agent, and a third party to arrange for the user to receive cash from the third party.

The user has a user device (e.g., a mobile phone, tablet computer, etc.) that executes a mobile application provided by a mobile application server (e.g., a provider institution computing system). The delivery agent has a delivery agent device (e.g., a mobile phone, tablet computer, etc.) that executes the mobile application. The third party has a cash storage device that communicates with the financial institution computing system. The financial institution computing system communicates with the mobile application and the cash storage device.

The user can use the mobile application to request cash, and the provider institution sends the cash request to one or more delivery agents via the mobile application. The provider institution computing system receives information from the cash storage device related to the amount of cash available in the cash storage device, the denominations of cash available, the currency available, and the status of the third party (e.g., open, closed, etc.). The provider institution computing system may send the cash request to the one or more delivery agents based on the locations of the one or more delivery agent devices relative to the user device and the cash storage device from which the cash can be withdrawn. At least one of the delivery agents accepts the cash delivery request via the mobile application, and the provider institution computing system provides the locations of the cash storage device and the user device to the delivery agent device. The provider institution computing system also provides authentication codes to both the user device and the delivery agent device to verify the transaction. The mobile application can provide the delivery agent device with directions to navigate to both the cash storage device and the user device. The cash storage device sends authentication information to the provider institution computing system to verify the cash withdrawal upon providing cash to the delivery agent. The mobile application sends authentication information to the provider institution computing system to verify the cash delivery upon the delivery agent providing the cash to the user.

Arrangements described herein optimize resources (e.g., the third parties have an abundance of cash that can be used instead of sitting idle with the third party). For example, the systems and methods described herein provide a location-based and availability-based mobile application and process that connect the user device, the delivery agent devices, and the third-party cash storage devices. By implementing a centralized management system (e.g., the provider institution computing system) that monitors, in real time or in near real time, the locations of the user device, the delivery agent devices, and the third-party cash storage devices, as well as the cash levels and status of the third-party cash storage devices, the arrangements described herein automates a cash delivery method in which the most efficient route (from a selected delivery agent's current location to the user's current location) can be selected. Furthermore, the arrangements described herein create cash efficiencies. For example, the cash collected by the third parties in their regular business activities would be deposited with a provider institution anyway if the cash were not redirected to the user. Directing the cash from the third parties to the user (via couriers such as the delivery agents) eliminates the process of the third party depositing the cash with the provider institution. The location-based and availability-based mobile application described herein provides a channel by which such process is automated. Additionally, the arrangements described herein capitalize on availability of third parties because adding third parties to the cash distribution network allows for more coverage in areas with higher population densities, making it easier for a user to get the needed cash as quickly as possible.

Figure 2:
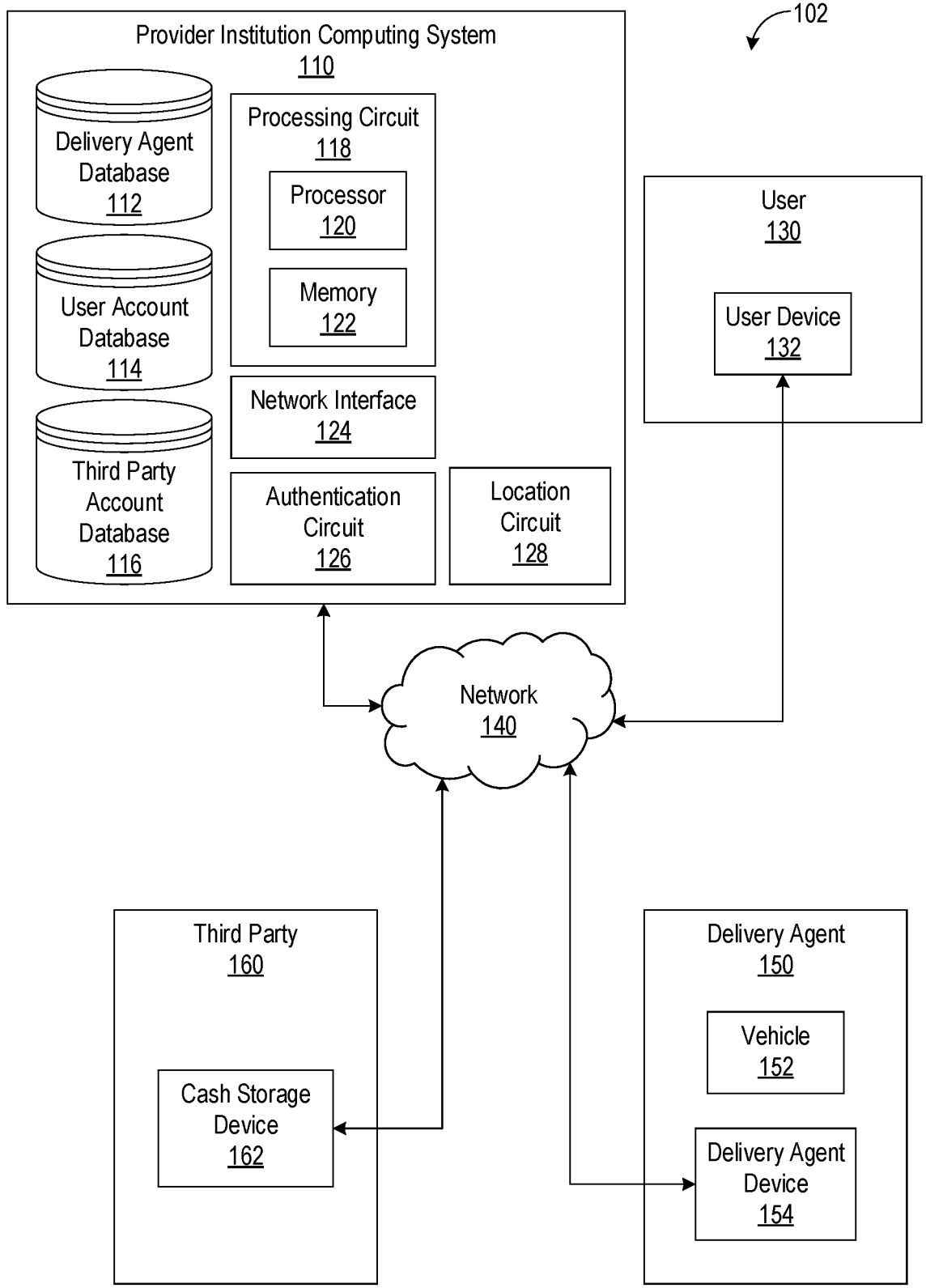
FIG. 2 is a block diagram of an example cash delivery system, according to some arrangements.

FIG. 1 is an illustration of a cash delivery method 100, according to some arrangements. FIG. 2 is a block diagram of an example cash delivery system 102, according to some arrangements. Referring to FIGS. 1-2, the method 100 involves a user 130, a delivery agent 150 in a delivery agent vehicle 152, and a third party 160. The user 130 has a user device 132 from which the user 130 requests cash via a mobile application. For example, the user 130 may be attending an event where cash is needed, and the user 130 does not have any cash. The request from the user is accepted by the delivery agent 150 via a delivery agent device 154, and the delivery agent 150 is provided instructions regarding how to navigate to the third party 160 and then to the user device 132. The delivery agent 150 proceeds to the third party 160 using the delivery agent vehicle 152. The delivery agent 150 verifies the identity of the delivery agent 150 with the third party 160, and the third party 160 provides the desired cash to the delivery agent 150. The delivery agent 150 then proceeds to the user 130 where the delivery agent 150 verifies the identity of the user 130, vice versa. In response to the identity of the user 130 being verified, the delivery agent 150 provides the desired cash to the user 130.

The system 102 includes a provider institution computing system 110, the user 130, the delivery agent 150, the third party 160, and a network 140. The user 130 includes the user device 132. The delivery agent 150 includes the delivery agent vehicle 152 and the delivery agent device 154. The third party 160 includes a cash storage device 162. Each of the provider institution computing system 110, the user device 132, the delivery agent device 154, and the cash storage device 162 is a computing system having suitable processing, storage, and networking capabilities.

The user device 132 may be any kind of device or system the user 130 can carry and provide for communication between the user device 132 and other devices. For example, the user device 132 can be a cellular phone, a tablet computer, a laptop computer, a personal digital assistant, or any other device that provides for communication. The user device 132 is further described with reference to FIG. 3.

The delivery agent device 154 may be any kind of device or system the delivery agent 150 can carry and provide for communication between the delivery agent device 154 and other devices. For example, the delivery agent device 154 can be a cellular phone, a tablet computer, a laptop computer, a personal digital assistant, or any other device that provides for communication. The delivery agent device 154 is further described with reference to FIG. 4.

The third party 160 can be any type of entity that typically has available cash on hand. Examples of the third party 160 include, but are not limited to, restaurants, corner stores, gas stations, or any other type of vendor that typically has cash on hand. The cash storage device 162 can be any type of device or system configured to store cash for transactions or future deposits. Examples of the cash storage device 162 include, but are not limited to, cash registers and safes. The cash storage device 162 is further described with reference to FIG. 5.

The provider institution computing system 110 includes a delivery agent database 112, a user account database 114, a third party account database 116, a processing circuit 118, a network interface 124, an authentication circuit 126, and a location circuit 128. The provider institution computing system 110 can be a computing system used by any type of provider institution. Examples of provider institutions include, but are not limited to, banks, credit card providers, and other institutions that provide financial services to users.

The delivery agent database 112 stores data related to a plurality of delivery agents (including the delivery agent 150). As referred to herein, a delivery agent is an individual that is authorized to receive cash on behalf of a user and deliver the cash to the user. Each delivery agent must be authorized by the provider institution computing system 110 prior to data related each delivery agent being added in the delivery agent database 112. The authorization process may include background checks, credit checks, and/or an application each delivery agent must fill out. Upon approval, information related to a delivery agent (e.g., the delivery agent 150) is uploaded to the delivery agent database. Information stored in the delivery agent database includes, but is not limited to, a name, address, contact information (including a mobile device number), vehicle information, photograph(s) of the delivery agent, and payment information related to each delivery agent.

The user account database 114 stores data related to each user that has an account with the provider institution. The user account database 114 includes personal data related to each user such as the user's name, address, contact information (including a mobile device number), and login information for accessing the user's information via a website or mobile application related to the provider institution. The user account database 114 also stores account information related to each user such as the user's account number (or numbers), the available balance in the user's account (or accounts), and any other information related to the user's account with the provider institution.

The third party account database 116 stores data related to each third party that has an account with the provider institution. The third party account database 116 includes data related to each third party such as the name of the third party, the address of the third party (or multiple addresses if the third party maintains multiple storefronts), the third party's account number (or numbers), the available balance in the third party's account (or accounts), and any other information related to the third party's account with the provider institution.

In some arrangements, the processing circuit 118 has a processor 120 and a memory 122. The processor 120 can be implemented as a general-purpose processor, an application specific integrated circuit (ASIC), field programmable gate arrays (FGPAs), a digital signal processor (DSP), a group of processing components, or other suitable electronic processing components. The memory 122 stores data and/or computer code for facilitating the various processes described herein. The memory 122 can be implemented as random access memory (RAM), read-only memory (ROM), non-volatile random access memory (NVRAM), Flash Memory, hard disk storage, and the like. Moreover, the memory 122 is or includes tangible, non-transient volatile memory or non-volatile memory. Accordingly, the memory 122 includes database components, object code components, script components, or any other type of information structure for supporting the various activities and information structures described herein.

The network interface 124 is configured for and structured to communicate data over the network 140. For example, the network interface 124 is configured for and structured to send and receive information related to a cash withdrawal transaction initiated by a user. Accordingly, the network interface 124 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The authentication circuit 126 is configured to generate authentication codes to be used during a cash withdrawal transaction. The authentication codes are sent from the provider institution computing system to the delivery agent device 152 and the user device 132 such that the devices can be authenticated during a transaction. The authentication codes can be any type of code that provide for a secure transaction. For example, the authentication codes can be generated as quick response (QR) codes, randomly generated alphanumeric codes, encrypted codes, etc. The authentication circuit 126 is also configured to receive signals sent from the user device 132, the delivery agent device 152, and the cash storage device 162 regarding the authenticity of a cash withdrawal transaction. In an example arrangement, the cash storage device 162 may scan a QR code on the delivery agent device 154 and provide the scanned image to the authentication circuit 126. The authentication circuit compares the QR code sent to the delivery agent device 154 to the QR code received from the cash storage device 162 to determine whether the two QR codes are equal. If the two QR codes are equal, the authentication circuit sends a message verifying the authenticity of the delivery agent device 154. In another example arrangement, the delivery agent device 154 may scan a QR code on the user device 132 and provide the scanned image to the authentication circuit 126. The authentication circuit compares the QR codes sent to the user device 132 to the QR code received from the delivery agent device 154 to determine whether the two QR codes are equal. If they are equal, the authentication circuit sends a message verifying the authenticity of the user device 132.

The location circuit 128 is configured to determine the location of the potential parties to a cash withdrawal transaction. The potential parties to a cash withdrawal transaction include the user 130, all potential delivery agents that are near the user 130 (e.g., within a predetermined distance such as but not limited to, five miles of the user 130), and all potential third parties that are near the user 130 (e.g., within a predetermined distance such as but not limited to, five miles of the user 130). In some arrangements, the location circuit 128 receives global positioning system ("GPS") coordinates of each of the potential parties to a transaction. The location circuit 128 can determine, based on the relative locations of each of the parties and the parties willing to engage in the transaction, the optimal delivery path. For example, after the user 130 requests cash the location circuit 128 determines which of the delivery agents in the delivery agent database are near the user device 132 based on the GPS coordinates of the devices associated with the delivery agents and the GPS coordinates of the user device 132. The location circuit 128 also determines, based on which delivery agent is delivering the cash, which third party is the optimal third party from which the cash will be withdrawn. For example, after determining that the delivery agent 150 is delivering cash to the user 130, the location circuit 128 determines, based on the GPS coordinates of each party, that the third party 160 is located between the user 130 and the delivery agent 150. The location circuit 128 routes the delivery agent 150 to the third party 160 to provide for the fastest and most efficient cash delivery.

Figure 3:
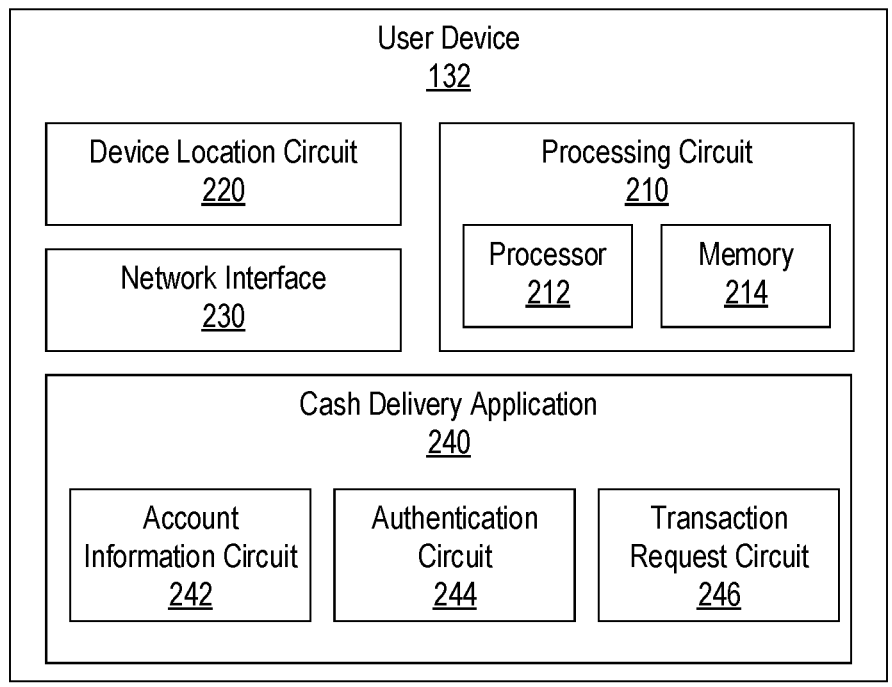
FIG. 3 is a block diagram of an example of a user device, according to some arrangements.

FIG. 3 is a block diagram of an example of the user device 132, according to some arrangements. The user device 132 includes a processing circuit 210, a device location circuit 220, a network interface 230, and a cash delivery application 240.

In some arrangements, the processing circuit 210 has a processor 212 and a memory 214. The processor 212 can be implemented as a general-purpose processor, an ASIC, FGPAs, a DSP, a group of processing components, or other suitable electronic processing components. The memory 214 stores data and/or computer code for facilitating the various processes described herein. The memory 214 can be implemented as RAM, ROM, NVRAM, Flash Memory, hard disk storage, and the like. Moreover, the memory 214 is or includes tangible, non-transient volatile memory or non-volatile memory. Accordingly, the memory 214 includes database components, object code components, script components, or any other type of information structure for supporting the various activities and information structures described herein.

The device location circuit 220 is configured to determine the location of the user device 132 and provide the location of the user device 132 to other entities (e.g., the location circuit 128) via the network interface 230. The device location circuit 220 determines the location of the user device 132 based on the GPS coordinates of the user device 132. In some arrangements, the device location circuit 220 is a GPS receiver. In some arrangements, the device location circuit 220 is in communication with a GPS receiver of the user device 132. The device location circuit 220 can determine the GPS location of the user device 132 based on GPS signals received from GPS satellites.

The network interface 230 is configured for and structured to communicate data over the network 140. For example, the network interface 230 is configured for and structured to send and receive information related to a cash withdrawal transaction initiated by a user. Accordingly, the network interface 230 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The cash delivery application 240 is software configured to run on a mobile device or other computing device (e.g., the user device 132, the delivery agent device 154, etc.). The cash delivery application 240 is configured to initiate a cash withdrawal transaction and provide information regarding the transaction to the parties involved in the transaction. The cash delivery application 240 includes an account information circuit 242, an authentication circuit 244, and a transaction request circuit 246.

The account information circuit 242 is configured to access information regarding the account of the user 130 with the provider institution computing system 110. For example, the account information circuit 242 communicates with the user account database 114 to provide the user 130 with current information regarding the account of the user 130 (e.g., how much cash is available to be withdrawn).

The authentication circuit 244 is configured to receive an authentication code from the provider institution computing system 110 and provide the authentication code for verification of a cash withdrawal transaction. In arrangements where the authentication code is encrypted, the authentication circuit 244 is configured to decrypt the authentication code when providing the authentication code for verification purposes.

The transaction request circuit 246 is configured to process a cash withdrawal request from the user 130 and send the cash withdrawal request from the user device 132 to the provider institution computing system 110. The transaction request circuit 246 provides information including the amount of cash desired, the account(s) from which the cash is desired, and the currency in which the cash is desired.

Figure 4:
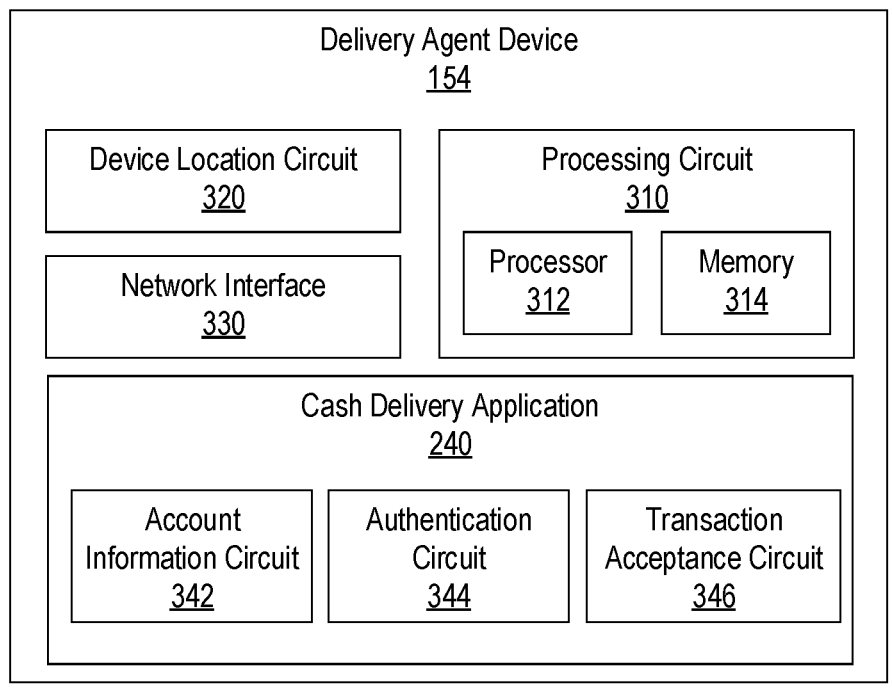
FIG. 4 is a block diagram of an example of a delivery agent device, according to some arrangements.

FIG. 4 is a block diagram of an example of the delivery agent device 154, according to some arrangements. The delivery agent device 154 includes a processing circuit 310, a device location circuit 320, a network interface 330, and the cash delivery application 240.

In some arrangements, the processing circuit 310 has a processor 312 and a memory 314. The processor 312 can be implemented as a general-purpose processor, an ASIC, FGPAs, a DSP, a group of processing components, or other suitable electronic processing components. The memory 314 stores data and/or computer code for facilitating the various processes described herein. The memory 314 can be implemented as RAM, ROM, NVRAM, Flash Memory, hard disk storage, and the like. Moreover, the memory 314 is or includes tangible, non-transient volatile memory or non-volatile memory. Accordingly, the memory 314 includes database components, object code components, script components, or any other type of information structure for supporting the various activities and information structures described herein.

The device location circuit 320 is configured to determine the location of the delivery agent device 154 and provide the location of the delivery agent device 154 to other entities (e.g., the location circuit 128) via the network interface 330. The device location circuit 320 determines the location of the delivery agent device 154 based on the GPS coordinates of the delivery agent device 154. In some arrangements, the device location circuit 320 is a GPS receiver. In some arrangements, the device location circuit 320 is in communication with a GPS receiver of the delivery agent device 154. The device location circuit 320 can determine the GPS location of the delivery agent device 154 based on GPS signals received from GPS satellites.

The network interface 330 is configured for and structured to communicate data over the network 140. For example, the network interface 330 is configured for and structured to send and receive information related to a cash withdrawal transaction initiated by a user. Accordingly, the network interface 330 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The cash delivery application 240 further includes an account information circuit 342, an authentication circuit 344, and a transaction acceptance circuit 346. The account information circuit 342 is configured to access information regarding the account of the delivery agent 150 with the provider institution computing system 110. For example, the account information circuit 342 communicates with the delivery agent database 112 to provide the delivery agent 150 with current information regarding the account of the delivery agent 150 (e.g., how many deliveries the delivery agent 150 has successfully completed, how other users have ranked the service of the delivery agent 150, etc.).

The authentication circuit 344 is configured to receive an authentication code from the provider institution computing system 110 and provide the authentication code for verification of a cash withdrawal transaction. In arrangements where the authentication code is encrypted, the authentication circuit 344 is configured to decrypt the authentication code when providing the authentication code for verification purposes.

The transaction acceptance circuit 346 is configured to process a cash withdrawal acceptance from the delivery agent 150 and send the acceptance from the delivery agent device 154 to the provider institution computing system 110.

Figure 5:
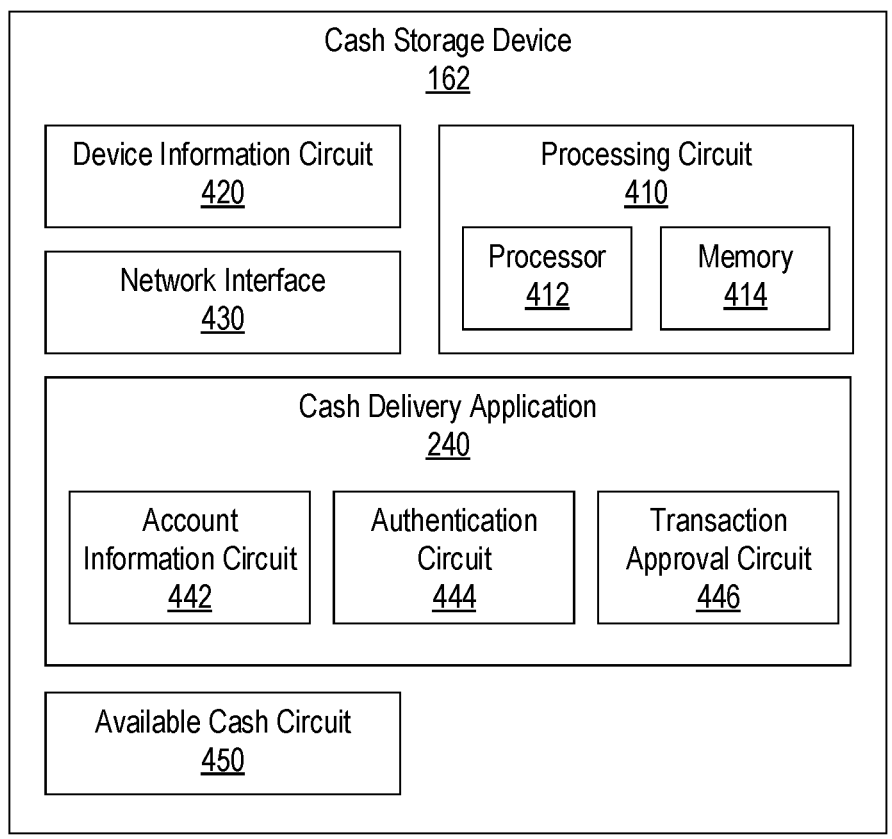
FIG. 5 is a block diagram of an example cash storage device, according to some arrangements.

FIG. 5 is a block diagram of the cash storage device 162, according to some arrangements. The cash storage device 162 includes a processing circuit 410, a device information circuit 420, a network interface 430, the cash delivery application 240, and an available cash circuit 450.

In some arrangements, the processing circuit 410 has a processor 412 and a memory 414. The processor 312 can be implemented as a general-purpose processor, an ASIC, FGPAs, a DSP, a group of processing components, or other suitable electronic processing components. The memory 414 stores data and/or computer code for facilitating the various processes described herein. The memory 414 can be implemented as RAM, ROM, nonNVRAM, Flash Memory, hard disk storage, and the like. Moreover, the memory 414 is or includes tangible, non-transient volatile memory or non-volatile memory. Accordingly, the memory 414 includes database components, object code components, script components, or any other type of information structure for supporting the various activities and information structures described herein.

The device information circuit 420 is configured to provide information related to the cash storage device 162 to the provider institution computing system 110. Examples of information provided to the provider institution computing system 110 include, but are not limited to, the location of the cash storage device 162, whether the cash storage device 162 is in operation, and whether the third party 160 is open for business at the time the cash delivery is requested. In some arrangements, the cash storage device 162 may include a GPS receiver that provides an exact GPS location of the cash storage device 162. In some arrangements, the third party 160 may have a GPS receiver that provides the exact location of the third party 160 in which the cash storage device 162 is located. In still other arrangements, the location of the cash storage device 162 may be approximated by the address of the third party 160 in which the cash storage device 162 is located. In arrangements where the cash storage device 162 is not in operation (e.g., the cash storage device 162 is malfunctioning, broken, or otherwise not operating properly), the device information circuit 420 provides information regarding the operational status of the cash storage device 162 to the provider institution computing system 110. In arrangements where the third party is closed, the device information circuit 420 notifies the provider institution computing system 110 that the cash storage device 162 is unavailable to dispense cash. In arrangements where the cash storage device 162 is operational and the third party is open for business, the device information circuit 420 notifies the provider institution computing system 110 that the cash storage device 162 is available to dispense cash.

The network interface 430 is configured for and structured to communicate data over the network 140. For example, the network interface 430 is configured for and structured to send and receive information related to a cash withdrawal transaction initiated by a user. Accordingly, the network interface 430 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The cash delivery application 240 further includes an account information circuit 442, an authentication circuit 444, and a transaction approval circuit 446. The account information circuit 442 is configured to access information regarding the account of the third party 160 with the provider institution computing system For example, the account information circuit 442 communicates with the third party account database 116 to provide the third party 160 with current information regarding the account of the third party 160 (e.g., the balance of the account from which cash will be withdrawn).

In some arrangements, the authentication circuit 444 is configured to receive an authentication code from the delivery agent device 154 and provide the authentication code to the authentication circuit 126 for verification of the delivery agent device 154 for a cash withdrawal transaction. In some arrangements, the authentication circuit 444 receives the same authentication code as the delivery agent device 154 and verifies the delivery agent device 154 without providing the authentication code to the authentication circuit 126. In such arrangements, the authentication circuit 444 compares the authentication code provided by the delivery agent device 154 to the authentication code provided by the provider institution computing system 110. If the authentication codes match, the delivery agent device 154 is verified and the cash is provided to the delivery agent 150 by the third party 160. In arrangements where the authentication code is encrypted, the authentication circuit 444 is configured to decrypt the authentication code provided by the delivery agent device 154 in order to verify the delivery agent device 154.

The transaction acceptance circuit 446 is configured to process a cash withdrawal acceptance from the delivery agent 150 and send the acceptance from the delivery agent device 154 to the provider institution computing system 110.

The available cash circuit 450 is configured to determine data related to the amount of cash available for withdrawal and communicate the data to the provider institution computing system 110. The data determined by the available cash circuit 450 includes, but is not limited to, the total value of cash on hand in the cash storage device 162, the denominations of cash on hand in the cash storage device 162, the number of bills of each denomination of cash available in the cash storage device 162, and the type of currency (e.g., US dollars, Euros, etc.) available in the cash storage device 162. The cash storage device 162 can make these determinations in various ways.

In one arrangement, the available cash circuit 450 may tracks sales, including how much cash has been loaded into the cash storage device 162 and how much cash has been removed from the cash storage device 162. Based on the sales data, the available cash circuit 450 can determine how much cash is in the cash storage device 162 and send cash level indicators to the provider institution computing system 110. In some arrangements, cash level indicators can be sent to the provider institution computing system 110 after each sale is completed. In some arrangements, cash level indicators can be sent to the provider institution computing system 110 periodically, at regular intervals (e.g., every ten minutes, every half hour, every hour, etc.) throughout each day. By enabling the available cash circuit 450 to provide real-time or near-real-time updates regarding the amount of cash that the cash storage device 162 stores, the provider institution computing system 110 can leverage the up-to-date information to select an appropriate third-party cash storage device 162 for the cash delivery in the manner described.

In one arrangement, the cash storage device 162 includes various sensors coupled to the available cash circuit 450 to determine the data related to the cash on hand. The cash storage device may include optical sensors configured to determine the type of currency based on images of the available currency. The optical sensors may also be configured to determine how many bills of each denomination are available based on a height of a stack of bills. The cash storage device 162 may also be equipped with weight sensors that can detect the weight of cash to determine how many bills are available in a stack of bills. For example, in arrangements where the cash storage device 162 is a cash register, each cash receiving slot may be equipped with an optical sensor and or a weight sensor such that the available cash circuit 450 can determine the type of currency available in each cash receiving slot, the denomination of the currency available, and how many bills of each denomination are available. In one arrangement, the available cash circuit 450 includes a bill counter that can count the amount of cash stored in a cash storage of the cash storage device 162.

Prior to the available cash circuit 450 sending a cash level indicator to the provider institution computing system 110, the sensor or the bill counter determines the amount of cash stored in the cash storage by counting the bills. In response to the sensor or the bill counter determining the amount of cash stored in the cash storage, the available cash circuit 450 automatically (without any human input) sends a cash level indicator corresponding to the amount of stored cash to the provider institution computing system 110. In that regard, the sensor or the bill counter can also determine the amount of cash periodically, at regular intervals (e.g., every ten minutes, every half hour, every hour, etc.) throughout each day.

Figure 6:
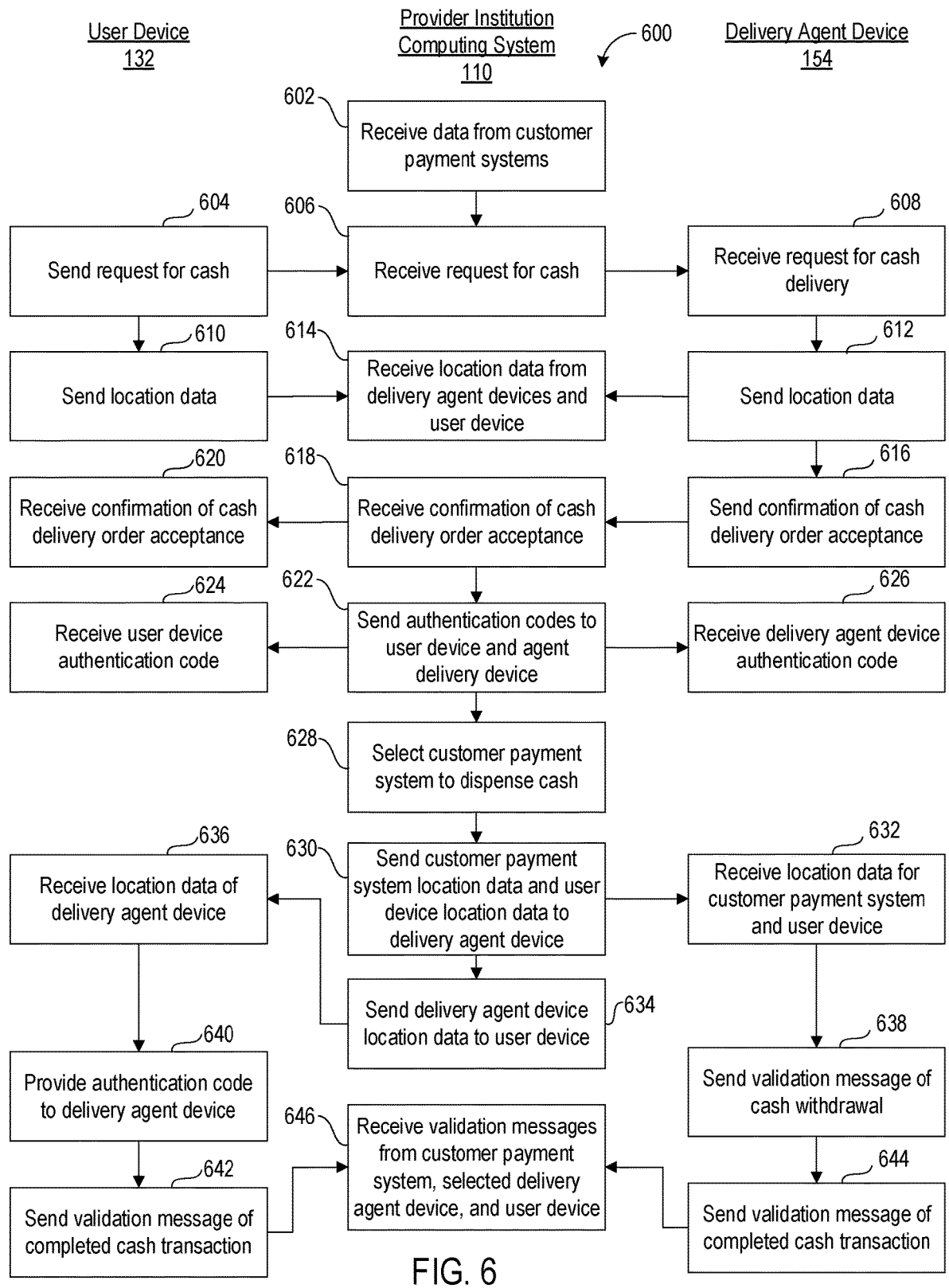
FIG. 6 is a flow diagram illustrating a method for processing a cash delivery request, according to various arrangements.
Figure 7:
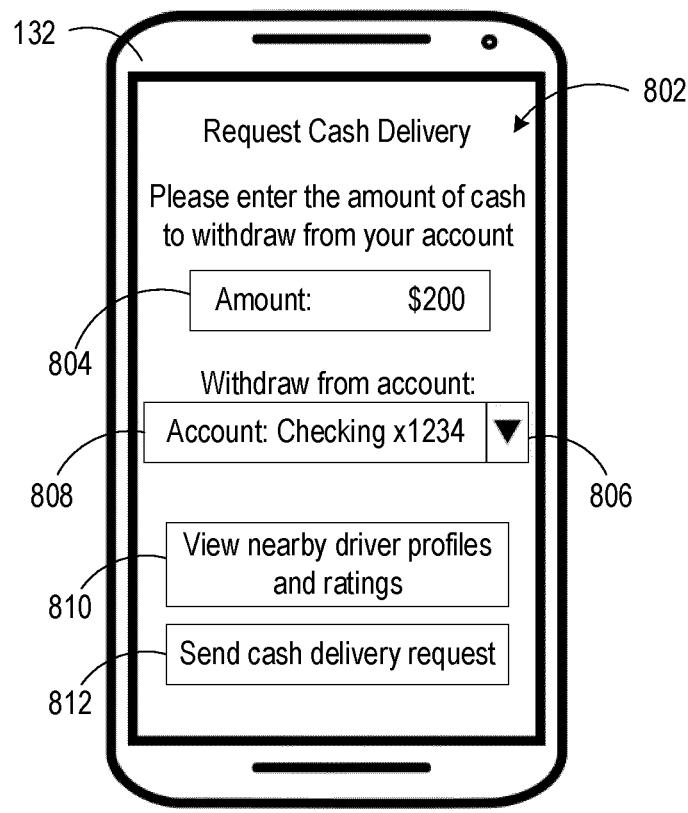
FIGS. 7-15 are illustrations of a mobile application used to deliver cash to a user.
Figure 8:
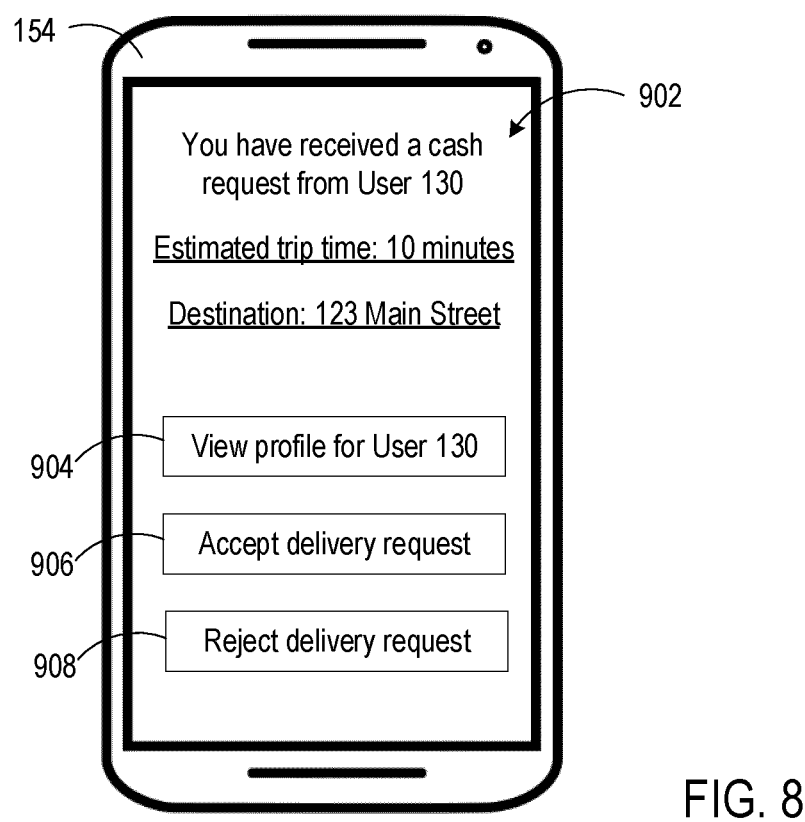
Figure 9:
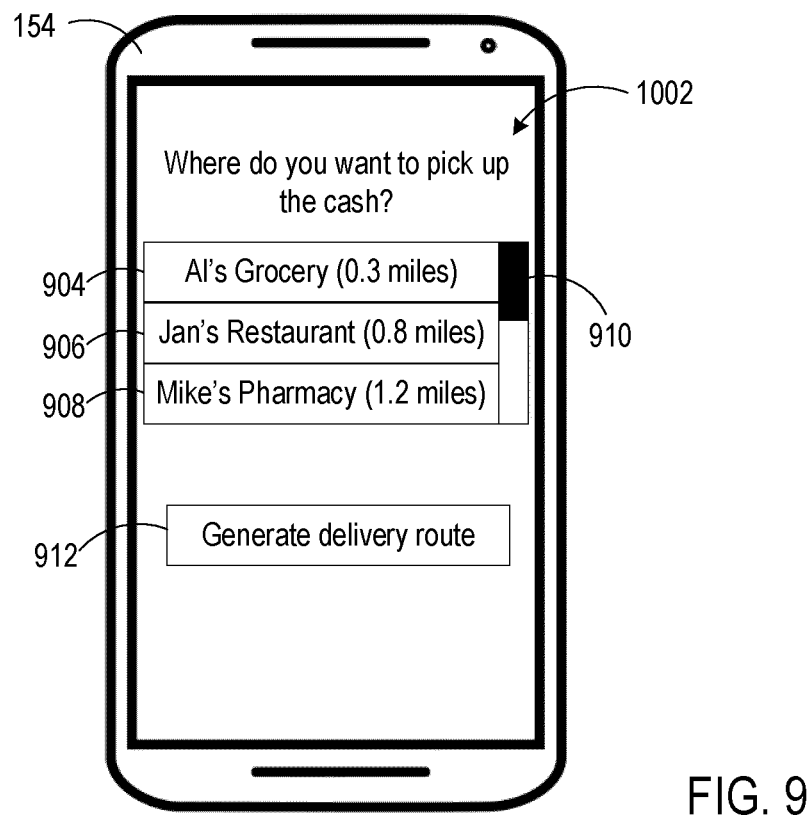
Figure 10:
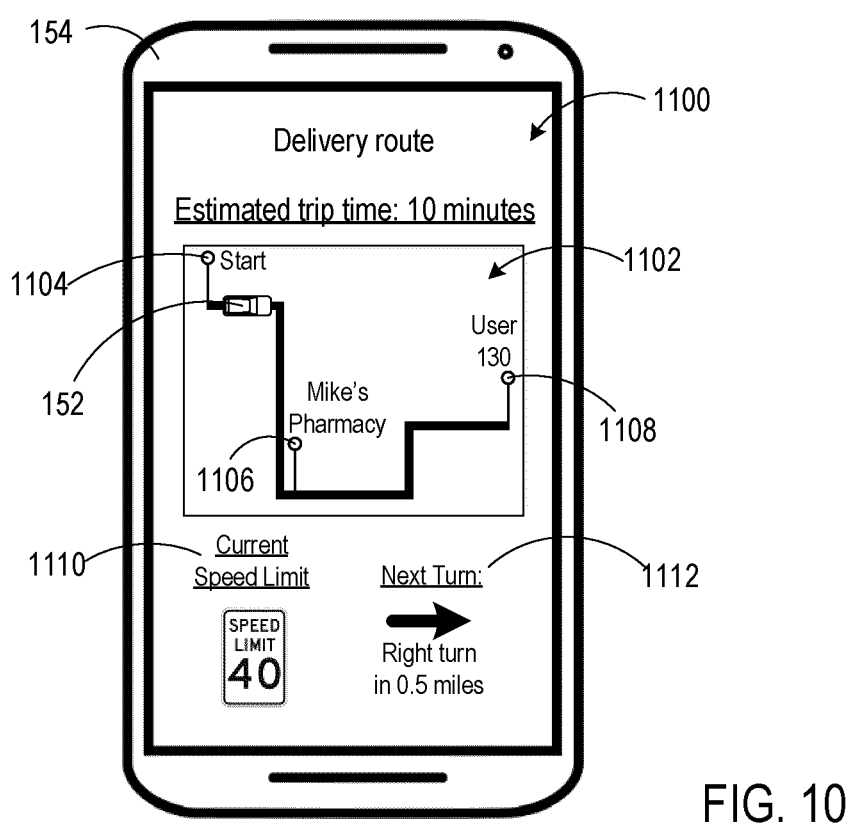
Figure 11:
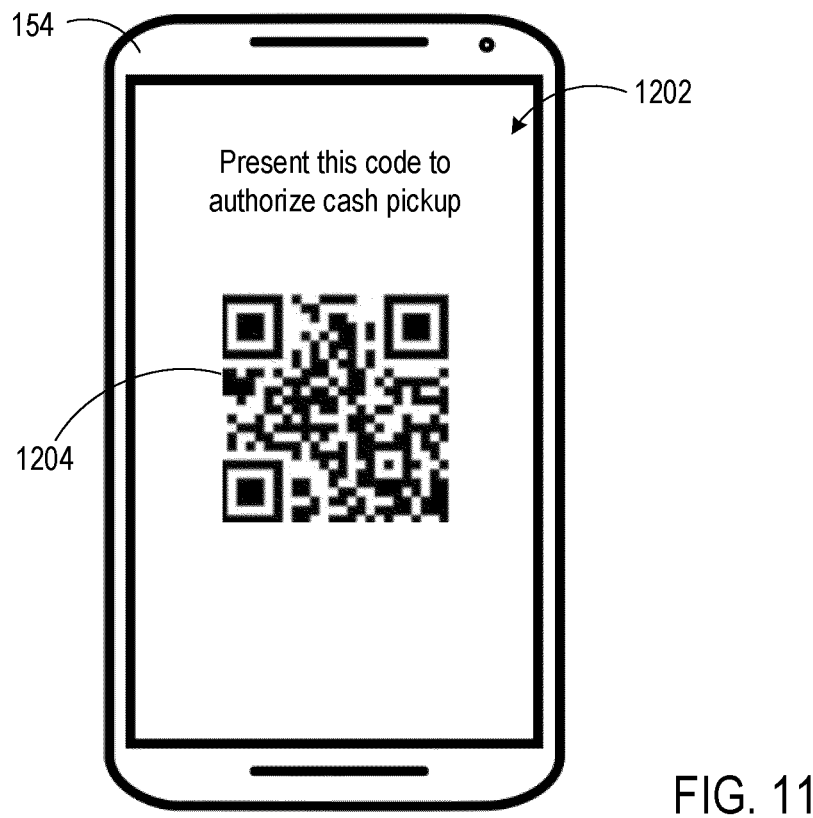
Figure 12:
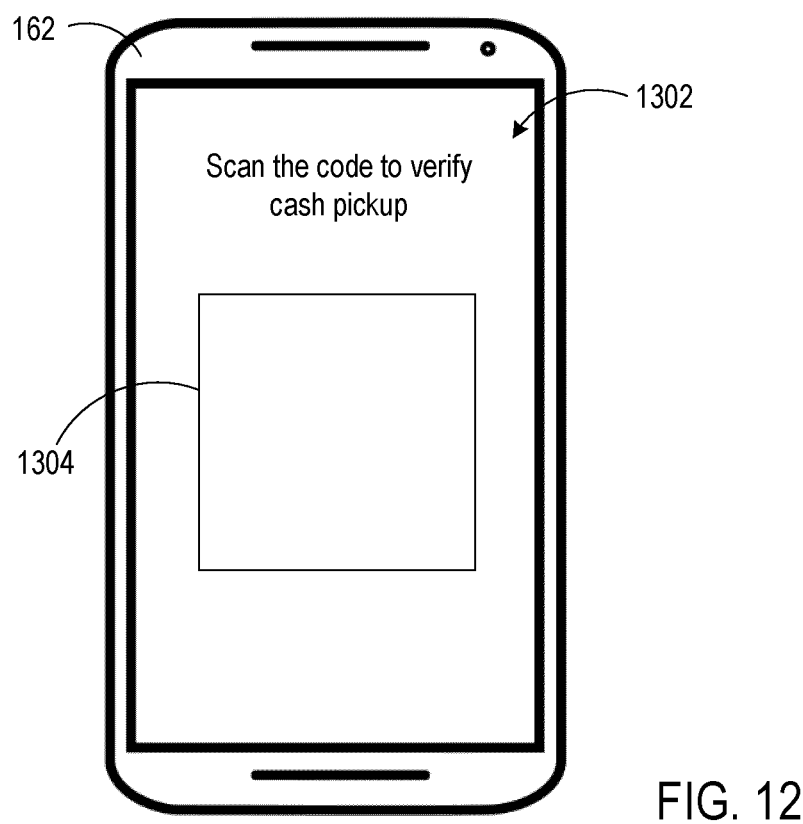
Figure 13:
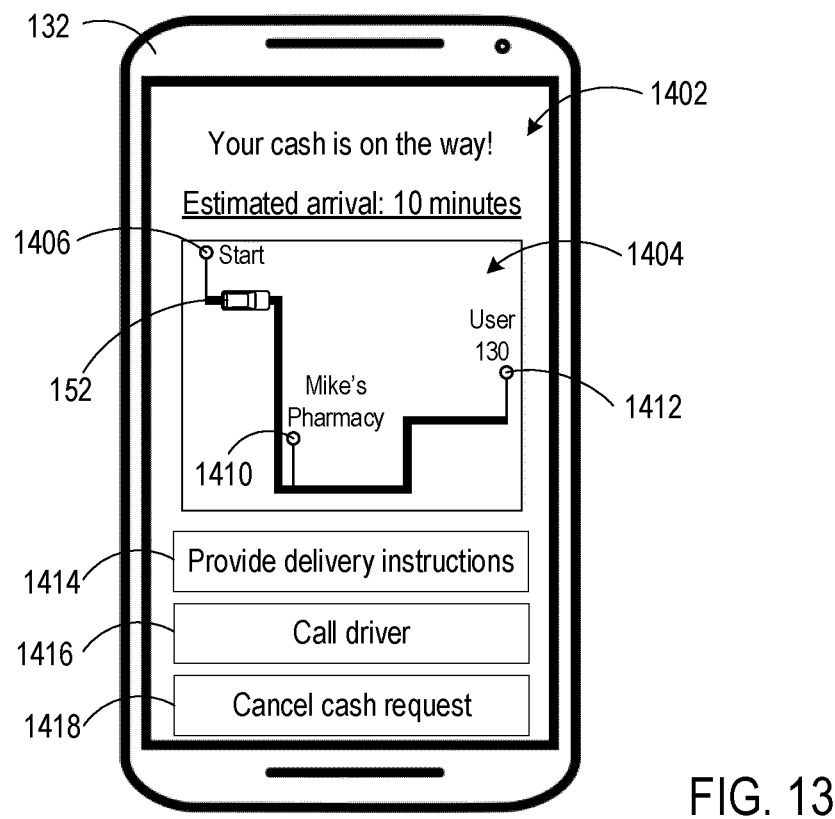
Figure 14:
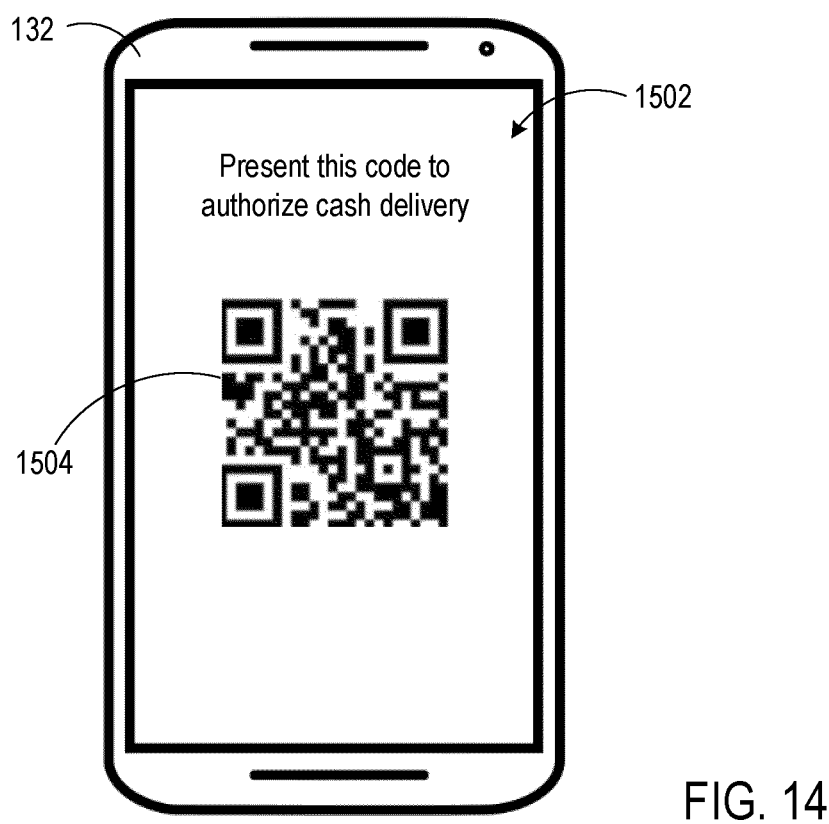
Figure 15:
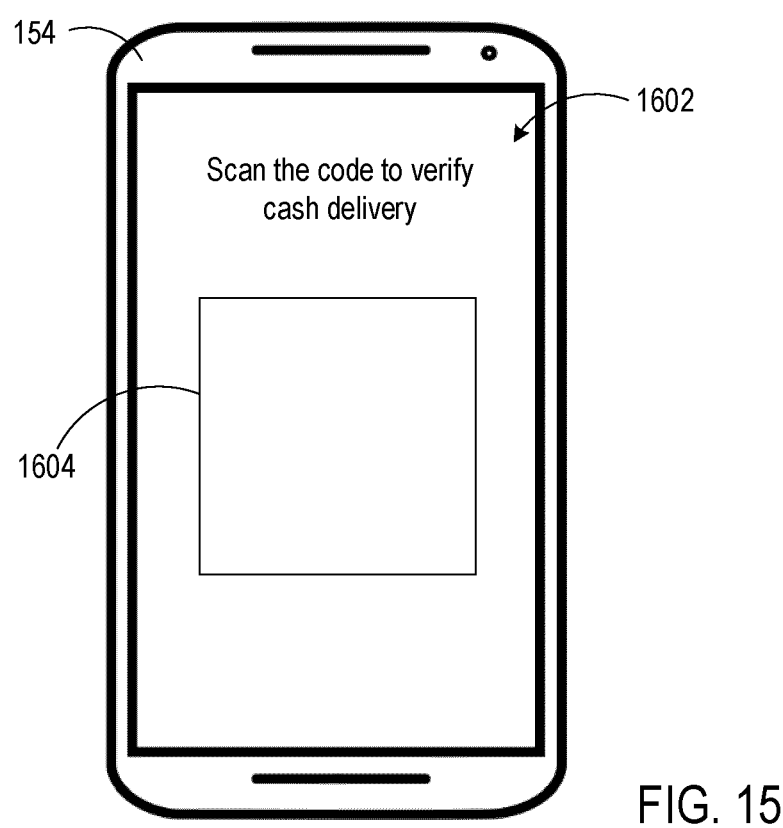

FIG. 6 is a flow diagram illustrating a method 600 for processing a cash delivery request, according to various arrangements. Referring to FIGS. 2-5, the method 600 can be executed by the user device 132, the delivery agent device 154, and the provider institution computing system 110, in some embodiments.

At 602, data is received from customer payment systems. In some arrangements, the customer payment systems are various cash storage devices (such as but not limited to, the cash storage device 162) located at various third party locations. In some arrangements, the provider institution computing system receives data from the available cash circuit 450 and the device information circuit 420 related to the cash storage device 162. The data can include information related to the amount of cash available, the type of currency available, the number of bills of each denomination of currency available, whether the cash storage device 162 is operational, whether the third party 160 is open for business, the location of the third party 160, and the location of the cash storage device 162. In some arrangements, the data is sent after completion of each transaction at the third party 160. In some arrangements, the data is sent at regular intervals (e.g., every 10 seconds, every two minutes, every ten minutes, etc.).

At 604, a request for cash is sent. In some arrangements, the user 130 may be at a location where the user 130 needs cash but cannot access the needed cash. The user 130 sends a request for cash via the user device 132 to the provider institution computing system 110. The request for cash may include information regarding the request such as the amount of cash desired, the type of currency desired, the denominations of cash desired, the location to which the user wants the cash delivered, etc.

At 606, the request for cash is received. In some arrangements, the provider institution computing system 110 receives the request from the user device 132. The provider institution computing system 110 can then verify that the user 130 has enough funds in an account by referencing the user account database 114 and confirming that the user account associated with the device from which the request was sent (e.g., the user device 132) includes sufficient funds for the withdrawal. Upon verifying that the account of the user 130 has sufficient funds for the cash withdrawal, the provider institution computing system 110 send the request for cash to a plurality of potential delivery agents (including the delivery agent 150).

At 608 the request for cash delivery is received. In some arrangements, the plurality of potential delivery agents are notified of the request for cash delivery by a message on a delivery agent device for each of the plurality of potential delivery agents. For example, the delivery agent 150 receives the request for cash via a notification on the delivery agent device 154. In some arrangements, the request for cash includes the amount of cash desired and the location to which the user 130 wants the cash delivered. In some arrangements, the location is provided as an approximate location entered by the user 130 when sending the request. In some arrangements, the location is provided as a GPS location of the user device 132.

At 610, location data is sent from the user device 132. The user device 132 sends location data related to the user device 132 to the provider institution computing system 110. In some arrangements, the location data includes the GPS coordinates of the user device 132. In some arrangements, the location data includes an approximate location of the user device 132 as an address at which the user 130 would like the cash delivered. In some arrangements, the location data is provided continuously (e.g., every second, every five seconds, every ten seconds, etc.) such that the location data provided is accurate even if the user 130 is moving.

At 612, location data is sent from the delivery agent device 154. The delivery agent device 154 sends location data related to the delivery agent device 154 to the provider institution computing system 110. In some arrangements, the location data includes the GPS coordinates of the delivery agent device 154. In some arrangements, the location data is provided continuously (e.g., every second, every five seconds, every ten seconds, etc.) such that the location data provided is accurate even if the delivery agent 150 is moving.

At 614, the provider institution computing system receives the location data from the user device 132 and the delivery agent device 154. In some arrangements, the provider institution computing system 110 receives the location data continuously such that the provider institution computing system 110 can provide accurate cash delivery recommendations. In some arrangements, the provider institution computing system 110 receives the location data for the user device 132 and the delivery agent device 154 prior to sending the case delivery request. In such arrangements, the provider institution computing system determines which of the plurality of delivery agents to notify of the cash delivery request based on the proximity of the plurality of potential delivery agent devices to the user device 132. For example, the provider institution computing system 110 may only send notification of the cash delivery request to the subset of the plurality of potential delivery agents that are within a five mile radius of the user device 132.

At 616, confirmation of cash delivery order acceptance is sent. In some arrangements, if the delivery agent 150 desires to deliver the cash to the user 130, the delivery agent 150 provides acceptance via the delivery agent device 154, and the delivery agent device 154 sends the acceptance to the provider institution computing system 110. In some arrangements, more than one of the plurality of delivery agents may send acceptance to the provider institution computing system 110.

At 618, the cash delivery order acceptance confirmation is received. In some arrangements, the provider institution computing system receives one acceptance from the delivery agent device 154. In some arrangements, the provider institution computing system receives multiple acceptances from the devices associated with the plurality of potential delivery agents. In such arrangements, the provider institution computing system 110 can determine which of the plurality of potential delivery agents to choose (e.g., the delivery agent 150). The provider institution computing system 110 can also provide the user 130 with information associated with the plurality of potential delivery agents such that the user can choose the delivery agent to deliver the cash (e.g., the delivery agent 150).

At 620, the user device 132 receives confirmation of the cash delivery order acceptance. In some arrangements, the user device 132 receives confirmation that the delivery agent 150 accepted the cash delivery request and will be delivering the cash. In some arrangements, the user device 132 receives confirmation that a plurality of delivery agents accepted the cash delivery request, and the user 130 must choose which of the plurality of delivery agents will deliver the cash. In such arrangements, the provider institution computing system 110 provides the user device 132 with information associated with each of the plurality of potential delivery agents. The information can include how long each of the plurality of potential delivery agents has been delivering cash, an approximate time until the cash is delivered from each of the plurality of potential delivery agents, the approximate location of each of the plurality of potential delivery agents relative to the location of the user 130, ratings associated with each of the plurality of potential delivery agents that have been submitted by other users, etc. After viewing the information, the user 130 can choose which of the plurality of potential delivery drivers to deliver the cash, and the user device 132 sends confirmation of the choice to the provider institution computing system 110. The provider institution computing system 110 notifies each of the plurality of potential delivery agents of the decision by the user 130. In arrangements where one of the plurality of potential delivery agents is not chosen, a notification is sent that the user chose a different delivery agent. In arrangements where the delivery agent is chosen (e.g., the delivery agent 150), the delivery agent device 154 receives a notification that the acceptance of the delivery agent 150 was accepted by the user 130.

At 622, authentication codes are sent to the user device 132 and the delivery agent device 154. In some arrangements, the provider institution computing system 110 provides codes to the user device 132 and the delivery agent device 154 in order to verify the identity of the delivery agent 150 and the user 130 during the cash delivery transaction. The codes may be in the form of bar codes, QR codes, numeric codes, alphanumeric codes, etc. Upon each exchange of cash in the cash withdrawal transaction, a code must be verified for the transaction to continue. For example, to withdraw cash the delivery agent 150 must present the delivery agent authentication code to the third party 160 via the delivery agent device 154 such that the third party 160 can verify the identity of the delivery agent 150 prior to giving the cash to the delivery agent 150. In some arrangements, the provider institution computing system 110 also provides the delivery agent authentication code to the third party 160. Similarly, the user 130 must present the user authentication code to the delivery agent 150 via the user device 132 such that the delivery agent 150 can verify the identity of the user 130 prior to giving the cash to the user 130.

At 624, the user device 132 receives the user authentication code from the provider institution computing system 110. At 628, the delivery agent device 154 receives the delivery agent authentication code from the provider institution computing system 110. In some arrangements, the delivery agent device 154 also receives the user authentication code such that the delivery agent device 154 can confirm the identity of the user 130.

At 628, a customer payment system is selected to dispense the desired cash. The provider institution computing system 110 selects the customer payment system (e.g., the cash storage device 162) based on the data received at 602, the locations of the user device 132 and the delivery agent device 154, and the locations of the third parties where the customer payment systems are located. In some arrangements, the provider institution computing system 110 can determine which potential customer payment systems to eliminate based on proximity to the user 130 and the delivery agent 150. For example, the user 130 and the delivery agent 150 may be in Chicago, so the provider institution computing system 110 can eliminate every potential third party that is not located in Chicago. Additionally, in some arrangements the provider institution computing system 110 can determine which potential customer payment systems would provide for the most efficient cash delivery route. For example, the provider institution computing system 110 may identify a plurality of potential customer payment systems located in between the user 130 and the delivery agent 150 that would allow the delivery agent 150 to receive the cash on the way to the user 130. In some arrangements, the provider institution computing system 110 determines which of the plurality of potential customer payment systems are available (e.g., the third party where the potential customer payment systems are open for business). For example, the provider institution computing system 110 may eliminate potential customer payment systems located in third parties that are closed or not operational.

At 630, the customer payment system location data and the location data of the user device 132 are provided to the delivery agent 150. In some arrangements, the delivery agent device 154 receives location data from the provider institution computing system 110 regarding the locations of the customer payment system (e.g., the cash storage device 162) and the user (e.g., the user device 132). In some arrangements, the provider institution computing system 110 provides directions on the delivery agent device 154 to direct the delivery agent 150 to the cash storage device 162 and to the user device 132.

At 632, the location data for the user device 132 and the customer payment system are received by the delivery agent device 154. In some arrangements, the delivery agent device 154 provides a graphical view of the locations of the delivery agent device 154, the cash storage device 162, and the user device 132, along with directions from the delivery agent device 154 to each of the other locations.

At 634, the location data of the delivery agent device 154 is sent to the user device 132. In some arrangements, the provider institution computing system 110 sends the GPS location of the delivery agent device 154 continuously to the user device 132 so the user 130 can monitor the progress of the delivery agent 150. In some arrangements, the provider institution computing system 110 sends the GPS location of the delivery agent device 154 to the user device 132 at regular intervals (e.g., every five seconds, every ten seconds, every fifteen seconds, etc.).

At 636, location data of the delivery agent device 154 is received. In some arrangements, the provider institution computing system 110 provides a graphical representation of the location of the delivery agent 150 relative to the user 130 so the user can monitor the progress of the delivery agent 150.

At 638, a cash withdrawal validation message is received. In some arrangements, when the delivery agent 150 arrives at the third party 160 to withdraw cash from the cash storage device 162, the delivery agent 150 must present the delivery agent authentication code to the third party 160. The delivery agent device 154 can display the delivery agent authentication code, and the delivery agent authentication code can be read by a code reader associated with the cash storage device 162. For example, the cash storage device 162 may include a code reader that is configured to scan a bar code or a QR code. Upon scanning the delivery agent authentication code, the scanned code is compared to the code provided to the third party 160 by the provider institution computing system 110. If the codes match, the delivery agent 150 is verified and the cash is provided to the delivery agent 150. The cash storage device 162 sends a validation message to the provider institution computing system 110 to confirm the cash was provided to the delivery agent 150. In some arrangements where the third party 160 is not provided with a code for verification, upon scanning the delivery agent authentication code, the scanned code is sent to the provider institution computing system 110 where the authentication circuit 126 determines if the scanned code matches the code sent to the delivery agent device 154. If the codes match, the provider institution computing system 110 sends a message to the third party 160 or the cash storage device 162 that the transaction is validated, and the third party 160 can provide the cash to the delivery agent 150. The provider institution computing system 110 then updates the account of the third party 160 in the third party account database 116 to account for the cash provided to the delivery agent 150.

At 640, the user authentication code is provided to the delivery agent device 154. In some arrangements, when the delivery agent 150 arrives at the location of the user 130 to provide the cash to the user 130, the user 130 must present the user authentication code to the delivery agent 150. The user device 132 can display the user authentication code, and the user authentication code can be read by a code reader associated with the delivery agent device 154. For example, the delivery agent device 154 may include a code reader or a camera that is configured to scan a bar code or a QR code. Upon scanning the user authentication code, the scanned code is compared to the code provided to the delivery agent device 154 by the provider institution computing system 110. If the codes match, the user 130 is verified and the cash is provided to the user 130 by the delivery agent 150. The delivery agent device 154 sends a validation message to the provider institution computing system 110 to confirm the cash was provided to the user 130. In some arrangements where the delivery agent device 154 is not provided with a code for verification, upon scanning the user authentication code, the scanned code is sent to the provider institution computing system 110 where the authentication circuit 126 determines if the scanned code matches the code sent to the user device 132. If the codes match, the provider institution computing system 110 sends a message to the delivery agent device 154 that the transaction is validated, and the delivery agent 150 can provide the cash to the user 130. The provider institution computing system 110 then updates the account of the user 130 in the user account database 114 to account for the cash provided to the user 130.

At 642 and 644 validation messages are sent for the completed cash transaction. In some arrangements, after receiving the cash, the user device 132 sends a message to the provider institution computing system 110 that the transaction is complete. In some arrangements, after delivering the cash, the delivery agent device 154 sends a message to the provider institution computing system 110 that the transaction is complete.

FIGS. 7-15 are illustrations of the cash delivery application 240 used facilitate a cash delivery. The mobile application is included on, or is accessible by, the user device 132, the delivery agent device 154, and the cash storage device 162.

To initiate a cash request, the user 130 opens the cash delivery application 240 on the user device 132. The cash delivery application 240 provides the display 802 for the user to enter information regarding the desired cash withdrawal and delivery. The user 130 enters the desired amount of cash in box 804. If the user has more than one account, the user can select the account from which cash will be withdrawn in box 808 using the dropdown arrow 806. In some arrangements, the display 802 can include other options such as selecting the denominations of cash desired or selecting a desired type of currency. In some arrangements, the user 130 can also view the profiles of nearby drivers (e.g., potential delivery agents) by selecting box 810 to see if any of the nearby drivers would be preferred. After the user 130 has staged the cash delivery request, the user sends the cash delivery request to the provider institution computing system 110. The provider institution computing system 110 then sends the request to nearby potential delivery agents.

The delivery agent 150, receives notification of the delivery request submitted by the user 130 on the delivery agent device 154 via the cash delivery application 240. The cash delivery application 240 provides the display 902 for the delivery agent 150 to view the details related to the delivery request. The display 902 can include information such as the estimated time to complete the transaction and the destination address (e.g., the location of the user device 132 based on the GPS coordinates of the user device 132). The delivery agent may also be able to view the profile of the user 130 by selecting box 904. The profile of the user 130 may include information regarding how many deliveries the user 130 has requested, how many deliveries the user 130 has cancelled, etc. The delivery agent 150 can accept the delivery request by selecting box 906, or the delivery agent 150 can reject the delivery request by selecting box 908. The result of the selection by the delivery agent 150 is then sent to the provider institution computing system 110 by the delivery agent device 154.

After the delivery agent 150 is selected (either by the user 130 or the provider institution computing system 110), the provider institution computing system 110 determines the available customer payment systems from which the delivery agent 150 can withdraw cash. In some arrangements, the provider institution computing system 110 chooses which customer payment system to use for the cash withdrawal. In some arrangements, the provider institution computing system 110 allows the delivery agent 150 to choose the customer payment system from which the cash will be withdrawn. In such arrangements, the provider institution computing system 110 sends a list of the customer payment systems from which the delivery agent 150 can choose as a list via the cash delivery application 240. The cash delivery application 240 provides the display 1002 for the delivery agent 150 to choose the desired customer payment system from which to withdraw cash. The customer payment system may be displayed as the name of the store or venue where the customer payment system is located. The delivery agent 150 can scroll through the available options using the scroll bar 910 and selects one of the options presented in boxes 904, 906, or 908. After selecting the desired customer payment system, the delivery agent 150 selects box 912 to generate a delivery route from the delivery agent device 154 to the customer payment system (e.g., the cash storage device 162) and then to the user device 132.

In some arrangements, the delivery route is generated by the provider institution computing system 110 based on the locations of the delivery agent device 154, the cash storage device 162, and the user device 132. In some arrangements, the locations of each of the devices is provided to another application on the delivery agent device 154 to generate the delivery route. In either case, the delivery route is displayed via the display 1100 on the cash delivery application 240. The display 1100 can include the total estimated time to complete the trip, a map 1102 showing the entire route including the starting point 1104, the third party location 1106, and the location 1108 of the user device 132. The map 1102 provides the location of the delivery agent vehicle 152 in real time so the delivery agent 150 can successfully navigate to the cash storage device 162 and the user device 132. The map 1102 may also show other information such as a speed limit indicator 1110 to notify the delivery agent 150 of the speed limit, and a next turn indicator 1112 to notify the delivery agent 150 of the next required turn to remain on the desired route.

After the delivery agent 150 arrives at the third party 160 to withdraw cash from the cash storage device 162, the identity of the delivery agent 150 must be verified before the third party 160 provides cash to the delivery agent 150. The delivery agent 150 presents the delivery agent device 154 to the third party 160 after the display 1202 of the cash delivery application 240 provides the delivery agent authentication code.

The third party 160 then scans the delivery agent authentication code to verify the identity of the delivery agent 150. In some arrangements, the cash storage device 162 includes a scanning component configured to scan the authentication code. In such arrangements, the cash delivery application 240 provides a window 1304 on a display 1302 in which the delivery agent authentication code is centered such that it can be appropriately scanned. As described, the delivery agent authentication code can be verified either by the cash storage device 162 or the provider institution computing system 110. In either case, after the delivery agent authentication code is verified, the third party 160 provides the desired cash to the delivery agent 150 from the cash storage device 162. The delivery agent 150 then proceeds to the location of the user device 132 by using the map 1102.

The user 130 is able to view the progress of the delivery agent 150 throughout the route of the delivery agent 150 via the user device 132. The cash delivery application 240 provides a map 1404 on a display 1402 such that the user 130 can see the location of the delivery agent vehicle 152 along the cash delivery route. The cash delivery route includes the starting location 1406, the customer payment system location 1410, and the location of the user 130, and the user 130 can view the location of the delivery agent 150 in real time as the delivery agent 150 moves along the route. The user 130 also has the option to provide additional delivery instructions by selecting the delivery instruction box 1414. The user 130 can also select the call driver box 1416 if the user desires to call the delivery agent 150 for any reason. The user 130 can also select to cancel the cash delivery request by selecting the box 1418.

When the delivery agent 150 arrives at the location of the user device 132, the identity of the user 130 must be verified before the delivery agent 150 provides the cash to the user 130. The user 130 presents the user device 132 to the delivery agent 150 after the display 1402 of the cash delivery application 240 provides the user authentication code.

The delivery agent 150 then scans the user agent authentication code to verify the identity of the user 130. In some arrangements, the delivery agent device 154 includes a scanning component configured to scan the authentication code. In such arrangements, the cash delivery application 240 provides a window 1604 on a display 1602 in which the user authentication code is centered such that it can be appropriately scanned. As described, the user authentication code can be verified either by the delivery agent device 154 or the provider institution computing system 110. In either case, after the delivery agent authentication code is verified, the delivery agent 150 provides the desired cash to the user 130.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present invention.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:

receiving, by a provider institution computing system via a network, a cash level indicator from each of a plurality of customer payment systems, the plurality of customer payment systems receiving cash from customers of a plurality of stores;

receiving, by the provider institution computing system via the network, a cash request from a user device of a user responsive to interactions received via an application executing on the user device;

selecting, by the provider institution computing system, a customer payment system of the plurality of customer payment systems from which cash will be retrieved to satisfy the cash request, the customer payment system selected based on the cash level indicator and location data of a plurality of delivery agent devices of delivery agents;

sending, by the provider institution computing system to a selected delivery agent device, responsive to authenticating the selected delivery agent device based on an authentication credential provided by the selected delivery agent device a message comprising location data of the customer payment system, the selected delivery agent device being one of the plurality of delivery agent devices;

responsive to receiving an encrypted authentication code from the customer payment system, decrypting, by the provider institution computing system, the encrypted authentication code to generate a decrypted authentication code; and transmitting, by the provider institution computing system, a verification message indicating the selected delivery agent is authenticated responsive to the decrypted authentication code matching a delivery agent authentication code previously provided to the selected delivery agent device.

2. The method of claim 1, further comprising:
sending, by the provider institution computing system via the network, the delivery agent authentication code to the selected delivery agent device; and
sending, by the provider institution computing system via the network, a user authentication code to the user device.

3. The method of claim 2, further comprising:
receiving, by the provider institution computing system via the network, a first validation message from the selected customer payment system;
receiving, by the provider institution computing system via the network, a second validation message from the selected delivery agent device; and
receiving, by the provider institution computing system via the network, a third validation message from the user device.

4. The method of claim 3, wherein the delivery agent authentication code and the user authentication code comprise one or more of a bar code, a numerical code, an alphanumeric code, or a biological code.

5. The method of claim 1, wherein the location data of the plurality of delivery agent devices is determined based on a plurality of global positioning system signals from the plurality of delivery agent devices.

6. The method of claim 1, wherein the cash level indicator comprises one or more of a total value of cash, a type of currency, or an amount of bills of a specified denomination.

7. The method of claim 1, wherein selecting the selected customer payment system further comprises receiving, by the provider institution computing system, a message from the selected customer payment system indicating the selected customer payment system is available.

8. The method of claim 1, further comprising sending, by the provider institution computing system, the location data of the selected delivery agent device to the user device.

9. A provider institution computing system, comprising:
a network interface; and
a processing circuit configured to:
receive a cash level indicator from each of a plurality of customer payment systems, the plurality of customer payment systems receiving cash from customers of a plurality of stores;
receive a cash request from a user device of a user responsive to interactions received via an application executing on the user device;
select a customer payment system of the plurality of customer payment systems from which cash will be retrieved to satisfy the cash request, the customer payment system selected based on the cash level indicator and location data of a plurality of delivery agent devices of delivery agents;
send a message comprising location data of the selected customer payment system to a selected delivery agent device responsive to authenticating the selected delivery agent device based on an authentication credential provided by the selected delivery agent device, the selected delivery agent device being one of the plurality of delivery agent devices;
responsive to receiving an encrypted authentication code from the customer payment system, decrypt the encrypted authentication code to generate a decrypted authentication code; and
transmit a verification message indicating the selected delivery agent is authenticated responsive to the decrypted authentication code matching a delivery agent authentication code previously provided to the selected delivery agent device.

10. The system of claim 9, the processing circuit further configured to:
send the delivery agent authentication code to the selected delivery agent device; and
send a user authentication code to the user device.

11. The system of claim 10, the processing circuit further configured to:
receive a first validation message from the selected customer payment system;
receive a second validation message from the selected delivery agent device; and
receive a third validation message from the user device.

12. The system of claim 11, wherein the delivery agent authentication code and the user authentication code comprise one or more of a bar code, a numerical code, an alphanumeric code, or a biological code.

13. The system of claim 9, wherein the location data of the plurality of delivery agent devices is determined based on a plurality of global positioning system signals from the plurality of delivery agent devices.

14. The system of claim 9, wherein the cash level indicator comprises one or more of a total value of cash, a type of currency, or an amount of bills of a specified denomination.

15. The system of claim 9, wherein selecting the selected customer payment system further comprises receiving, by the provider institution computing system, a message from the selected customer payment system indicating the selected customer payment system is available.

16. The system of claim 9, further comprising sending, by the provider institution computing system, the location data of the selected delivery agent device to the user device.

17. A system for processing cash withdrawal and delivery requests, comprising:
a non-transitory computer-readable medium of a provider institution computing system storing computer-readable instructions such that, when executed, causes a processing circuit to:
receive a cash level indicator from each of a plurality of customer payment systems, the plurality of customer payment systems receiving cash from customers of a plurality of stores;
receive a cash request from a user device of a user responsive to interactions received via an application executing on the user device;
select a customer payment system of the plurality of customer payment systems from which cash will be retrieved to satisfy the cash request, the customer payment system selected based on the cash level indicator and location data of a plurality of delivery agent devices of delivery agents;
send a message comprising location data of the selected customer payment system to a selected delivery agent device responsive to authenticating the selected delivery agent device based on an authentication credential provided by the selected delivery agent device, the selected delivery agent device being one of the plurality of delivery agent devices;
responsive to receiving an encrypted authentication code from the customer payment system, decrypt the encrypted authentication code to generate a decrypted authentication code; and
transmit a verification message indicating the selected delivery agent is authenticated responsive to the decrypted authentication code matching a delivery agent authentication code previously provided to the selected delivery agent device.

18. The system of claim 17, the processing circuit further configured to:
   send the delivery agent authentication code to the selected delivery agent device; and
   send a user authentication code to the user device.

19. The system of claim 18, the processing circuit further configured to:
   receive a first validation message from the selected customer payment system;
   receive a second validation message from the selected delivery agent device; and
   receive a third validation message from the user device.

20. The system of claim 19, wherein the delivery agent authentication code and the user authentication code comprise one or more of a bar code, a numerical code, an alphanumeric code, or a biological code.

21. The system of claim 17, wherein the location data of the plurality of delivery agent devices is determined based on a plurality of global positioning system signals from the plurality of delivery agent devices.

22. The system of claim 17, wherein the cash level indicator comprises one or more of a total value of cash, a type of currency, or an amount of bills of a specified denomination.

23. The system of claim 17, wherein selecting the selected customer payment system further comprises receiving a message from the selected customer payment system indicating the selected customer payment system is available.

24. The system of claim 17, further comprising sending the location data of the selected delivery agent device to the user device.

* * * * *